United States Patent
Ouyang et al.

(10) Patent No.: US 10,261,796 B2
(45) Date of Patent: Apr. 16, 2019

(54) PROCESSOR AND METHOD FOR EXECUTING IN-MEMORY COPY INSTRUCTIONS INDICATING ON-CHIP OR OFF-CHIP MEMORY

(71) Applicant: BEIJING BAIDU NETCOM SCIENCE AND TECHNOLOGY CO., LTD., Beijing (CN)

(72) Inventors: Jian Ouyang, Beijing (CN); Wei Qi, Beijing (CN); Yong Wang, Beijing (CN)

(73) Assignee: BEIJING BAIDU NETCOM SCIENCE AND TECHNOLOGY CO., LTD, Beijing (CN)

( * ) Notice: Subject to any disclaimer, the term of this patent is extended or adjusted under 35 U.S.C. 154(b) by 157 days.

(21) Appl. No.: 15/360,245

(22) Filed: Nov. 23, 2016

(65) Prior Publication Data

US 2018/0052685 A1 Feb. 22, 2018

(30) Foreign Application Priority Data

Aug. 19, 2016 (CN) .......................... 2016 1 0693068

(51) Int. Cl.
*G06F 9/30* (2018.01)
*G06F 9/38* (2018.01)

(52) U.S. Cl.
CPC .......... *G06F 9/3016* (2013.01); *G06F 9/3001* (2013.01); *G06F 9/3004* (2013.01); *G06F 9/3802* (2013.01); *G06F 9/3824* (2013.01); *G06F 9/3877* (2013.01)

(58) Field of Classification Search
CPC .. G06F 9/3004; G06F 9/3016; G06F 9/30032; G06F 9/30043; G06F 9/30145
See application file for complete search history.

(56) References Cited

U.S. PATENT DOCUMENTS

| 7,725,521 | B2* | 5/2010 | Chen | G06F 9/30014 |
| | | | | 708/523 |
| 8,140,801 | B2* | 3/2012 | Arimilli | G06F 9/3834 |
| | | | | 711/118 |
| 2014/0032828 | A1* | 1/2014 | Khailany | G06F 3/065 |
| | | | | 711/105 |
| 2017/0285959 | A1* | 10/2017 | Mishaeli | G06F 9/3004 |

\* cited by examiner

*Primary Examiner* — Benjamin P Geib
(74) *Attorney, Agent, or Firm* — Seed IP Law Group LLP

(57) ABSTRACT

A processor and a method for executing an instruction on a processor are provided. In the method, a to-be-executed instruction is fetched, the instruction including a source address field, a destination address field, an operation type field, and an operation parameter field; in at least one execution unit, an execution unit controlled by a to-be-generated control signal according to the operation type field is determined, a source address and a destination address of data operated by the execution unit are determined according to the source address field and the destination address field, and a data amount of the data operated by the execution unit controlled by the to-be-generated control signal is determined according to the operation parameter field; the control signal is generated; and the execution unit in the at least one execution unit is controlled by using the control signal.

22 Claims, 4 Drawing Sheets

300

| source address field : 64 bits | destination address field : 64 bits | operation type field : 8 bits | operation parameter field : 56 bits |

PROCESSOR AND METHOD FOR EXECUTING IN-MEMORY COPY INSTRUCTIONS INDICATING ON-CHIP OR OFF-CHIP MEMORY

CROSS-REFERENCE TO RELATED APPLICATION

This application is related to and claims priority from Chinese Application No. 201610693068.1, filed on Aug. 19, 2016, the entire disclosure of which is hereby incorporated by reference.

TECHNICAL FIELD

The present application relates to the field of computer technology, in particular to the field of computer hardware technology, and in more particular to a processor and a method for executing instructions on a processor.

BACKGROUND

At present, commonly used processors include central processing units (CPUs) and graphics processing units (GPUs). Both the CPU and the GPU use an instruction set of a general-purpose processor. The instructions have a fine granularity. When a computing task is executed, the computing task is usually divided into a series of fine-granular instructions such as memory accesses, basic logical operations, and arithmetical operations.

If a processor uses the instructions in the above-mentioned conventional instruction set to process computing tasks in the field of artificial intelligence, a complex computing task needs to be divided into many instruction combinations in order to obtain the final result because the granularity is too fine, leading to low efficiency. Moreover, when the instructions in the conventional instruction set are executed, data needs to be frequently exchanged between the execution unit of the processor and the memory, and therefore the efficiency is very low.

SUMMARY

An objective of the present application is to provide an improved processor and an improved method for executing an instruction on a processor, so as to solve the technical problem mentioned in the Background.

According to a first aspect, the present application provides a processor connected to a host and comprising an instruction fetching unit, a decoder and at least one execution unit, the instruction fetching unit being configured to fetch a to-be-executed instruction, the instruction comprising a source address field, a destination address field, an operation type field, and an operation parameter field; the decoder being configured to determine, in the at least one execution unit, an execution unit controlled by a to-be-generated control signal according to the operation type field, determine a source address and a destination address of data operated by the execution unit controlled by the to-be-generated control signal according to the source address field and the destination address field, determine a data amount of the data operated by the execution unit controlled by the to-be-generated control signal according to the operation parameter field, and generate the control signal according to the determined execution unit, the determined source address, the determined destination address, and the determined data amount; and the execution unit in the at least one execution unit being configured to execute an operation under control of the control signal.

In some embodiments, the decoder is further configured to: determine a function of the instruction based on the operation type field; and determine an execution unit executing the function in the at least one execution unit as the execution unit controlled by the to-be-generated control signal.

In some embodiments, the decoder is further configured to: determine an instruction type of the instruction according to the operation type field.

In some embodiments, the instruction type comprises: an internal copying instruction, which is an instruction for copying data on an on-chip memory and an off-chip memory of the processor; a host interface instruction, which is an instruction for transmitting a command or data between the processor and the host connected to the processor; and a calculation instruction, which is an instruction for executing a matrix operation.

In some embodiments, the decoder is further configured to: determine whether the source address is located in the on-chip memory or the off-chip memory and whether the destination address is located in the on-chip memory or the off-chip memory according to the operation parameter field, if it is determined that the instruction is an in-memory copy instruction.

In some embodiments, the decoder is further configured to: determine whether the instruction is for transmitting a command or data, and determine a transmission direction, according to the operation type field, if it is determined that the instruction is a host interface instruction.

In some embodiments, the decoder is further configured to: determine whether the source address is located in an on-chip memory of the host or the off-chip memory of the processor and whether the destination address is located in the on-chip memory of the host or the off-chip memory of the processor, according to the determined transmission direction, if it is determined that the instruction is for transmitting data.

In some embodiments, the decoder is further configured to: determine a command transmission type of command transmission executed by the execution unit controlled by the to-be-generated control signal according to the operation parameter field, if it is determined that the instruction is for transmitting a command.

In some embodiments, the decoder is further configured to: determine a matrix operation type of the matrix operation executed according to the operation type field, if it is determined that the instruction is a calculation instruction.

In some embodiments, the decoder is further configured to: determine a matrix size of a matrix involved in the matrix operation according to the operation parameter field.

In some embodiments, the decoder is further configured to: determine whether the source address is located in the on-chip memory or the off-chip memory and whether the destination address is located in the on-chip memory or the off-chip memory, according to the operation parameter field.

In some embodiments, the decoder is further configured to: determine a first execution unit for executing a matrix multiplication operation and a second execution unit for executing an activation function calculation in the at least one execution unit as the execution units controlled by the to-be-generated control signal, if it is determined that the matrix operation type is a matrix multiplication with an activation function calculation, and generate a transmission control signal for transmitting an operation result of the first execution unit to the second execution unit.

In some embodiments, the decoder is further configured to: determine an activation function type of an activation function calculation according to the operation parameter field, if it is determined that the matrix operation type is a matrix operation with an activation function calculation.

According to a second aspect, the present application provides a method for executing an instruction on a processor, comprising: fetching a to-be-executed instruction, the instruction comprising a source address field, a destination address field, an operation type field, and an operation parameter field; determining, in at least one execution unit, an execution unit controlled by a to-be-generated control signal according to the operation type field, determining a source address and a destination address of data operated by the execution unit controlled by the to-be-generated control signal according to the source address field and the destination address field, and determining a data amount of the data operated by the execution unit controlled by the to-be-generated control signal according to the operation parameter field; generating the control signal according to the determined execution unit, the determined source address, the determined destination address, and the determined data amount; and controlling, by using the control signal, the execution unit in the at least one execution unit to execute an operation.

In some embodiments, the determining, in at least one execution unit, an execution unit controlled by a to-be-generated control signal according to the operation type field comprises: determining a function of the instruction based on the operation type field; and determining an execution unit executing the function in the at least one execution unit as the execution unit controlled by the to-be-generated control signal.

In some embodiments, the determining a function of the instruction based on the operation type field comprises: determining an instruction type of the instruction according to the operation type field.

In some embodiments, the instruction type comprises: an internal copying instruction, which is an instruction for copying data on an on-chip memory and an off-chip memory of the processor; a host interface instruction, which is an instruction for transmitting a command or data between the processor and the host connected to the processor; and a calculation instruction, which is an instruction for executing a matrix operation.

In some embodiments, the determining a source address and a destination address of data operated by the execution unit controlled by the to-be-generated control signal according to the source address field and the destination address field comprises: determining whether the source address is located in the on-chip memory or the off-chip memory and whether the destination address is located in the on-chip memory or the off-chip memory according to the operation parameter field, if it is determined that the instruction is an in-memory copy instruction.

In some embodiments, the determining a function of the instruction based on the operation type field further comprises: determining whether the instruction is for transmitting a command or data, and determining a transmission direction, according to the operation type field, if it is determined that the instruction is a host interface instruction.

In some embodiments, the determining a source address and a destination address of data operated by the execution unit controlled by the to-be-generated control signal according to the source address field and the destination address field comprises: determining whether the source address is located in an on-chip memory of the host or the off-chip memory of the processor and whether the destination address is located in the on-chip memory of the host or the off-chip memory of the processor, according to the determined transmission direction, if it is determined that the instruction is for transmitting data.

In some embodiments, the method further comprises: determining a command transmission type of command transmission executed by the execution unit controlled by the to-be-generated control signal according to the operation parameter field, if it is determined that the instruction is for transmitting a command.

In some embodiments, the determining a function of the instruction based on the operation type field further comprises: determining a matrix operation type of the matrix operation executed according to the operation type field, if it is determined that the instruction is a calculation instruction.

In some embodiments, the determining a data amount of the data operated by the execution unit controlled by the to-be-generated control signal according to the operation parameter field comprises: determining a matrix size of a matrix involved in the matrix operation according to the operation parameter field.

In some embodiments, the determining a source address and a destination address of data operated by the execution unit controlled by the to-be-generated control signal according to the source address field and the destination address field comprises: determining whether the source address is located in the on-chip memory or the off-chip memory and whether the destination address is located in the on-chip memory or the off-chip memory, according to the operation parameter field.

In some embodiments, the determining an execution unit executing the function in the at least one execution unit as the execution unit controlled by the to-be-generated control signal comprises: determining a first execution unit for executing a matrix multiplication operation and a second execution unit for executing an activation function calculation in the at least one execution unit as the execution units controlled by the to-be-generated control signal, if it is determined that the matrix operation type is a matrix multiplication with an activation function calculation; and the method further comprises: generating a transmission control signal for transmitting an operation result of the first execution unit to the second execution unit.

In some embodiments, the method further comprises: determining an activation function type of an activation function calculation according to the operation parameter field, if it is determined that the matrix operation type is a matrix operation with an activation function calculation.

According to the processor and the method for executing an instruction on a processor as provided in the present application, because the address information is directly embedded in the instruction processed, no address needs to be read from a register file at the decoding stage, and operations such as summing an address and a segment address also do not need to be performed, thereby reducing the complexity of instruction decoding. In addition, such an instruction may use a specified operation parameter field to specify the data amount of the data operated each time, and the processor may operate a batch of data each time when executing the instruction. In this way, a complex operation task can be implemented by executing a small number of instructions, and the amount of data operated each time can be set flexibly, thereby improving the flexibility of operation.

BRIEF DESCRIPTION OF THE DRAWINGS

After reading detailed descriptions of non-limiting embodiments with reference to the following accompanying drawings, other features, objectives and advantages of the present application will be more apparent.

DETAILED DESCRIPTION OF EMBODIMENTS

The present application is further described in detail through the accompanying drawing and the embodiment. It should be understood that, the specific embodiments described herein are merely used to explain the relevant invention, and are not intended to limit the present invention. In addition, it should be further noted that, in order to facilitate the description, merely the parts related to the relevant invention are shown in the accompanying drawings.

It should be noted that, the embodiments of the present application and features in the embodiments may be combined on a non-conflict basis. The present application will be described in detail through the accompanying drawings and the embodiments.

Figure 1:
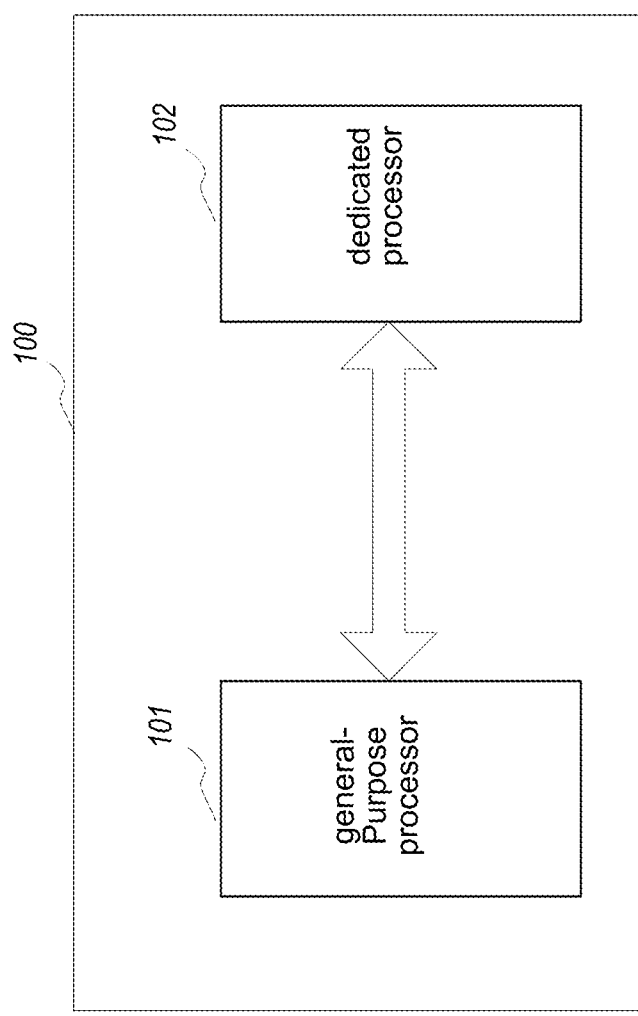
FIG. 1 is a diagram illustrating an exemplary system architecture to which the present application can be applied.

FIG. 1 illustrates an exemplary system architecture 100 to which a processor and a method for executing an instruction on a processor according to embodiments of the present application are applicable.

As shown in FIG. 1, the system architecture 100 may include a general-purpose processor 101 and a dedicated processor 102.

The general-purpose processor 101 is configured to send an external instruction (for example, a matrix operation instruction) and data to be processed (for example, a matrix) to the dedicated processor 102. The dedicated processor 102 may execute according to the external instruction, process the received data, and send a result generated from the processing back to the general-purpose processor 101, finally. The general-purpose processor 101 may also be referred to as a host, and the dedicated processor 102 may be designed from a Field-Programmable Gate Array (FPGA).

It should be noted that the processor provided in embodiments of the present application generally refers to the dedicated processor 102 in FIG. 1, and correspondingly, the method for executing an instruction on a processor is generally performed by the dedicated processor 102.

It should be understood that the numbers of the general-purpose processor 101 and the dedicated processor 102 in FIG. 1 are merely schematic. There may be any number of general-purpose processors and any number of dedicated processors as required in practice.

Figures 2, 3:
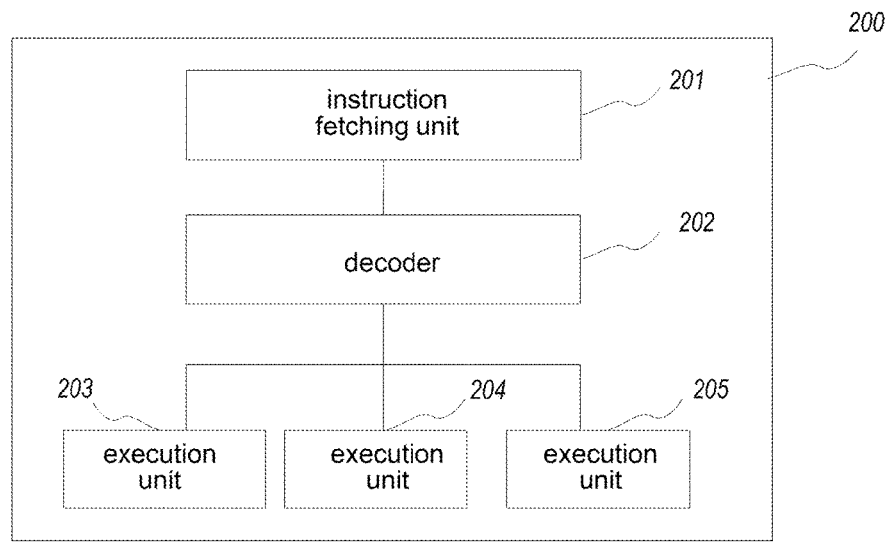
FIG. 2 is a schematic structural diagram of a processor according to an embodiment of the present application.
FIG. 3 is a schematic diagram of an instruction structure of an instruction executed by the processor according to the present application.

Referring to FIG. 2, a schematic structural diagram of a processor 200 according to the present application is illustrated.

As shown in FIG. 2, the processor 200 includes an instruction fetching unit 201, a decoder 202, and execution units 203, 204 and 205. It should be noted that the numbers of parts in the figure are merely exemplary, and there may be any number of general-purpose processors and dedicated processors. For example, the number of execution units is not limited to three as shown in the figure, and the actual number may be greater or less than three. In addition, the processor 200 may further include some memory parts not shown, for example, an external off-chip memory connected to the processor 200 and a memory inside the processor 200.

The instruction fetching unit 201 may be used for fetching an instruction to be executed, and the fetched instruction may be transmitted to the decoder 202 for decoding. The instruction to be executed may be stored in an instruction on-chip memory (not shown) of the processor 200. The instruction on-chip memory may be a part of the on-chip memory for storing instructions to be executed, or may be a separate memory designed for storing instructions to be executed. The fetched instruction includes a source address field, a destination address field, an operation type field, and an operation parameter field. FIG. 3 shows an alternative instruction format of the instruction. As shown in FIG. 3, the instruction includes a total of 196 bits, in which the first 64 bits are designed as the source address field, the following 64 bits may be designed as the destination address field, the following 8 bits may be set as the operation type field, and the last 56 bits may be designed as the operation parameter field. The source address field is used for describing source address information of data operated by the instruction, the destination address field is used for describing destination address information of the data operated by the instruction, the operation type field is used for describing information about a function of an operation performed by the instruction, and the operation parameter field is used for describing data amount information of data operated by the operation performed by the instruction. It should be noted that the instruction structure in FIG. 3 is merely exemplary. In practice, the lengths of the instruction and the fields may be different from those in the example of FIG. 3, the positions of the fields in the instruction may also be different from those in the example of FIG. 3, each field may be formed by non-consecutive flag bits in the instruction, and the name of each field is not intended to limit the field.

The decoder 202 may be used for decoding the instruction fetched by the instruction fetching unit 201, and generating a control signal according to the decoding result. The control signal is used for controlling one or more of the execution units 203, 204 and 205 to execute an operation.

Specifically, during decoding, the decoder 202 may determine, in the execution units 203, 204, and 205, an execution unit controlled by the control signal to be generated according to the operation type field. The decoder 202 may determine a source address and a destination address of data operated by the execution unit controlled by the control signal to be generated according to the source address field and the destination address field, and determine a data amount of the data operated by the execution unit controlled by the control signal to be generated according to the operation parameter field. Alternatively, when the control signal is used for controlling the execution unit to operate instructions, the data amount may be the number of instructions operated each time. When the control signal is used for controlling the execution unit to operate data blocks, the data amount may be the size of the data block operated each time. And, the decoder 202 may generate a corresponding control signal according to the determined execution unit, the determined source address, the determined destination address, and the determined data amount.

The execution units 203, 204 and 205 may be respectively used for executing various functions, including, but not limited to, a function of transmitting data or commands between the processor 200 and an external host (not shown), a function of copying data between an on-chip memory and an off-chip memory of the processor 200, and a calculation function. The execution units may perform corresponding operations under the control of a control signal generated by the decoder 202. The execution unit executes operations with coarse granularity under the control of the control signal, and can perform a memory access operation or a calculation operation on a large block of data each time, so that a complex calculation can be implemented by executing a small number of instructions. This approach can greatly reduce the number of instructions and improve the processing efficiency, compared with the conventional processor architecture.

In some alternative implementations of this embodiment, when determining, in the execution units 203, 204 and 205, the execution unit controlled by the control signal to be generated according to the operation type field, the decoder 202 may specifically perform the following steps. The decoder 202 first determines a function of the instruction according to the operation type field; and then determines an execution unit executing the function in the execution units 203, 204 and 205 as the execution unit controlled by the control signal to be generated. In practice, the instruction may use some flag bits in the operation type field to represent a function that the instruction needs to execute, and the decoder can determine the function by identifying the corresponding flag bits.

In some alternative implementations of this embodiment, when determining a function of the instruction according to the operation type field, the decoder 202 may determine an instruction type of the instruction according to the operation type field. Instructions of an identical instruction type may be one or more types of instructions that execute functions having a common feature. Generally, the decoder may determine the instruction type of the instruction according to some flag bits in the operation type field. When instructions of a certain instruction type include multiple types of instructions that execute different functions, the decoder 202 may further recognize a function of the instruction according to some other flag bits in the operation type field, so that the control signal to be generated can control the execution unit for performing the function. When instructions of a certain instruction type include instructions for only one type of function, the function of the instruction can be directly determined according to the instruction type of the instruction, so that the control signal to be generated can control the execution unit for performing the function.

Alternatively, the instruction type may include: an in-memory copy instruction, which is an instruction for copying data on an on-chip memory and an off-chip memory of the processor; a host interface instruction, which is an instruction for transmitting a command or data between the processor and the host connected to the processor; and a calculation instruction, which is an instruction for executing a matrix operation.

Functions performed by instructions whose instruction type is the internal copying instruction are to execute memory access operations for data between memories inside the processor 200. The functions may be copying data from the on-chip memory of the processor 200 to the off-chip memory of the processor 200, or copying data from the off-chip memory to the on-chip memory. In practice, the functions of the internal copying instruction mainly include: copying data from the off-chip memory to the on-chip memory so that a computing device such as an array processor can read data from the on-chip memory at a high rate to perform an operation, quickly writing the computing result of the computing device to the on-chip memory, and then writing data from the on-chip memory back to the off-chip memory. Generally, the on-chip memory has a higher read-write speed than the off-chip memory but has a smaller storage capacity than the off-chip memory. Reading and writing the cache are implemented by using the internal copying instruction. For example, the on-chip memory may be a static random access memory (SRAM), and the off-chip memory may be a double data rate (DDR) synchronous dynamic random access memory.

Functions performed by instructions whose instruction type is the host interface instruction are interacting between the processor 200 and the host connected to the processor 200. The functions may include command transmission between the processor 200 and the host, and data transmission between the processor 200 and the host; and may include transmission from the host to the processor 200, and transmission from the processor 200 to the host. In practice, the main function of this type of instructions is to implement interaction between an external host and the processor of the present invention, so that a computing task to be executed can be received from an external host, and the computing result of the computing task and a computing status can be returned to the external host.

Functions performed by instructions whose instruction type is the calculation instruction are matrix operations, for example, matrix multiplication with activation function calculation, alone matrix multiplication, matrix addition, and alone activation function. This type of instructions can implement an operation on a data block at a time, thus implementing computation with coarse granularity. Generally, when the calculation instruction is executed, data to be operated may be read from the on-chip memory of the processor 200 or the off-chip memory of the processor 200. The operation result may be written into the on-chip memory or the off-chip memory.

In some alternative implementations of this embodiment, the decoder 202 is further configured to: determine whether the source address is located in the on-chip memory or the off-chip memory and whether the destination address is located in the on-chip memory or the off-chip memory according to the operation parameter field, if it is determined that the instruction is an in-memory copy instruction.

In this implementation, for the in-memory copy instruction, the decoder 202 may determine the data amount of the copied data according to some flag bits in the operation parameter field. In addition, when determining a source address and a destination address of data operated by the execution unit controlled by the control signal to be generated according to the source address field and the destination address field, the decoder 202 may further determine whether the memory where the source address is located is the on-chip memory or the off-chip memory and whether the memory where the destination address is located is the on-chip memory or the off-chip memory, according to some other flag bits in the operation parameter field, so that data can be read from the determined source address and can be written to the determined destination address under the control of the control signal. For example, when determining that the instruction type is the in-memory copy instruction, the decoder 202 may identify the two least flag bits in the operation parameter field, determine the memory where the source address is located according to the least bit bit0, and determine the memory where the destination address is located according to the second least bit bit1. For example, when it is identified that bit0 is 0, it is determined that the source address is located in the off-chip memory; when it is identified that bit0 is 1, it is determined that the source address is located in the on-chip memory; when it is identified that bit1 is 0, it is determined that the destination address is located in the off-chip memory; when it is identified that bit1 is 1, it is determined that the destination address is located in the on-chip memory.

In some alternative implementations of this embodiment, the decoder 202 is further configured to: determine whether the instruction is for transmitting a command or data, and determine a transmission direction, according to the operation type field, if it is determined that the instruction is a host interface instruction.

In this implementation, if the decoder 202 determines that the instruction type of the instruction is the host interface instruction, the decoder 202 may further determine the command transmission or data transmission and determine the transmission direction, according to other flag bits in the operation type field being 0 or 1.

In some alternative implementations of this embodiment, the decoder 202 is further configured to: determine whether the source address is located in an on-chip memory of the host or the off-chip memory of the processor and whether the destination address is located in the on-chip memory of the host or the off-chip memory of the processor, according to the determined transmission direction, if it is determined that the instruction is for transmitting data.

In this implementation, because it has been determined that data transmission is to be performed by the instruction, the instruction is used for transmitting data between the on-chip memory of the host and the off-chip memory of the processor. The decoder may determine the data amount of the transmitted data according to some flag bits in the operation parameter field. In addition, the decoder 202 may determine whether the memory where the source address is located is the on-chip memory of the host or the off-chip memory of the processor and whether the memory where the destination address is located is the on-chip memory of the host or the off-chip memory of the processor, according to the determined transmission direction. If it is determined that the transmission direction is from the host to the processor, it is determined that the memory where the source address is located is the on-chip memory of the host and the memory where the destination address is located is the off-chip memory of the processor. On the contrary, if it is determined that the transmission direction is from the processor to the host, it is determined that the memory where the source address is located is the off-chip memory of the processor and the memory where the destination address is located is the on-chip memory of the host.

In some alternative implementations of this embodiment, the decoder 202 is further configured to: determine a command transmission type of command transmission executed by the execution unit controlled by the control signal to be generated according to the operation parameter field, if it is determined that the instruction is for transmitting a command.

In this implementation, after determining that the command transmission is performed by the instruction, the decoder 202 may determine whether the command is transmitted from an instruction memory of the host to an instruction memory of the processor 200, or from the instruction memory of the processor 200 to the instruction memory of the host. The decoder may determine the number of the commands transmitted according to some flag bits in the operation parameter field. In addition, because there are various different command transmission types, the decoder 202 may further determine the command transmission type according to some other flag bits in the operation parameter field. For example, the decoder 202 may determine whether to copy an instruction from the host or send an interrupt to the host according to different flag bits.

In some alternative implementations of this embodiment, the decoder 202 is further configured to: determine a matrix operation type of the matrix operation executed according to the operation type field, if it is determined that the instruction is a calculation instruction.

In this implementation, because the function performed by the calculation instruction may be multiple types of matrix operations, the decoder 202 may determine the matrix operation type of the matrix operation performed by the instruction according to some flag bits in the operation type field.

In some alternative implementations of this embodiment, the decoder 202 is used for determining a matrix size of a matrix involved in the matrix operation according to the operation parameter field. If the instruction type is the calculation instruction, the decoder 202 may determine the matrix size of the matrix involved in the matrix operation according to the operation parameter field, when determining the data amount of the data operated by the execution unit controlled by the control signal to be generated according to the operation parameter field. For example, when the executed matrix operation is an instruction multiplication operation, the decoder 202 may determine the length and width of a multiplier matrix and the length and width of a multiplicand matrix according to some flag bits in the operation parameter field.

In some alternative implementations of this embodiment, the decoder 202 is further configured to: determine whether the source address is located in the on-chip memory or the off-chip memory and whether the destination address is located in the on-chip memory or the off-chip memory, according to the operation parameter field. In this implementation, the decoder 202 may determine whether the memory where the source address is located is the on-chip memory or the off-chip memory according to some flag bits in the operation parameter field, that is, determine the memory from which the execution unit controlled by the control signal reads a matrix to be operated. The decoder 202 may also determine whether the memory where the destination address is located is the on-chip memory or the off-chip memory according to some other flag bits in the operation parameter field, that is, determine the memory to which the execution unit controlled by the control signal stores the operation result.

Alternatively, when the matrix operation includes an operation between two matrixes (for example, matrix multiplication and matrix addition), the decoder 202 may determine the storage addresses of the two matrixes to be added or multiplied according to different flag bits in the source address field. Taking a matrix multiplication operation as an example, the decoder 202 may determine the address of a multiplicand matrix according to low-order 32 bits in the source address field, and determine the address of a multiplier matrix according to high-order 32 bits in the source address field. As there is usually only one result matrix, the decoder 202 can directly determine the address to which the result matrix is to be written, according to the destination address field.

In some alternative implementations of this embodiment, the decoder 202 is further configured to: determine a first execution unit for executing a matrix multiplication operation and a second execution unit for executing an activation function calculation in the at least one execution unit as the execution units controlled by the control signal to be generated, if it is determined that the matrix operation type is a matrix multiplication with an activation function calculation, and generate a transmission control signal for transmitting an operation result of the first execution unit to the second execution unit.

Figure 4:
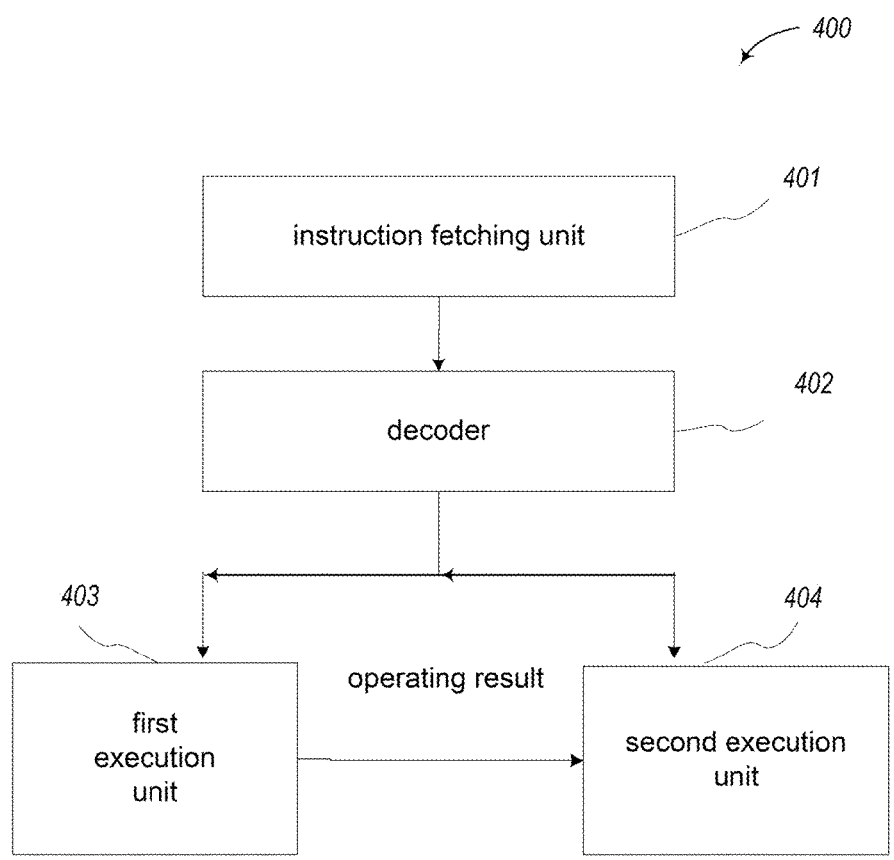
FIG. 4 is a schematic diagram illustrating the signal exchange between units of the processor according to some implementations of the present application.

FIG. 4 is a schematic diagram illustrating the signal exchange between units of the processor according to this implementation. As shown in FIG. 4, the instruction fetching unit 401 may fetch a calculation instruction, which is matrix multiplication with activation function calculation, and then send the calculation instruction to the decoder 402. The decoder 402 decodes the calculation instruction to generate a control signal used for controlling a first execution unit 403 for executing the matrix multiplication operation and to generate a control signal used for controlling a second execution unit 404 for executing the activation function calculation. In addition, the decoder 402 further generates a transmission control signal for transmitting the operation result of the first execution unit to the second execution unit. The result matrix obtained by the first execution unit 403 can be directly input to the second execution unit 404 by using the transmission control signal, to continue with the activation function calculation operation, thereby saving the time required for reading/writing the result matrix from the memory between the matrix multiplication operation and the activation function calculation operation. In addition, when the matrix multiplication with activation function calculation is continuously executed, the first execution unit 403 and the second execution unit 404 can execute the matrix multiplication and the activation function calculation in succession and in parallel, so that the time required for executing the activation function calculation is saved, thereby improving the instruction processing efficiency.

In some alternative implementations of this embodiment, the decoder 202 is further configured to: determine an activation function type of an activation function calculation according to the operation parameter field, if it is determined that the matrix operation type is a matrix operation with an activation function calculation. In this implementation, when the matrix operation type is a matrix operation with activation function calculation, because there are various different activation function types, the decoder may determine the activation function type of the activation function calculation according to some flag bits in the operation parameter field.

According to the processor provided in the above-mentioned embodiments of the present application, because the address information is directly embedded in the instruction processed, no address needs to be read from a register file at the decoding stage, and operations such as summing an address and a segment address also do not need to be performed, thereby reducing the complexity of instruction decoding. In addition, such an instruction may use a specified operation parameter field to specify the data amount of the data operated each time, and the processor may operate a batch of data each time when executing the instruction. In this way, a complex operation task can be implemented by executing a small number of instructions, and the amount of data operated each time can be set flexibly, thereby improving the flexibility of operation.

Figure 5:
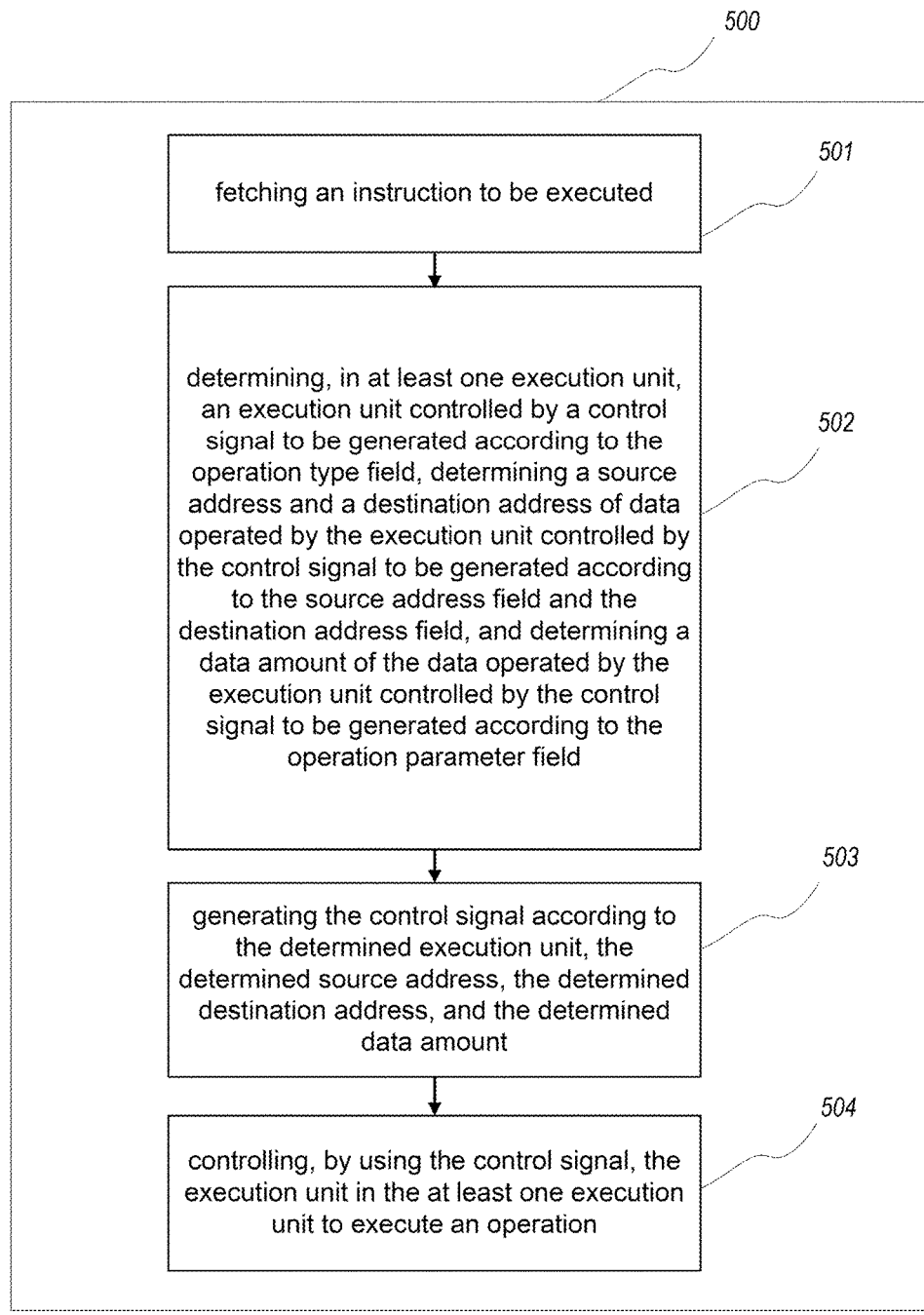
FIG. 5 is a flow chart of a method for executing an instruction on a processor according to an embodiment of the present application.

Referring to FIG. 5, a flowchart 500 of a method for executing an instruction on a processor according to an embodiment of the present application is illustrated. The method for executing an instruction on a processor includes the following steps.

Step 501: fetching an instruction to be executed.

In this embodiment, the processor (for example, the dedicated processor 102 in FIG. 1) first executes an instruction fetching operation, that is, fetches an instruction to be executed from a memory storing instructions. The instruction to be executed may be stored in an instruction on-chip memory of the processor.

The fetched instruction includes a source address field, a destination address field, an operation type field, and an operation parameter field.

Step 502: determining, in at least one execution unit, an execution unit controlled by a control signal to be generated according to the operation type field, determining a source address and a destination address of data operated by the execution unit controlled by the control signal to be generated according to the source address field and the destination address field, and determining a data amount of the data operated by the execution unit controlled by the control signal to be generated according to the operation parameter field. Alternatively, when the control signal is used for controlling the execution unit to operate instructions, the data amount may be the number of instructions operated each time. When the control signal is used for controlling the execution unit to operate data blocks, the data amount may be the size of the data block operated each time.

In this embodiment, the processor may decode the instruction fetched in step 501, and generate a control signal based on the decoding result.

Step 503: generating the control signal according to the determined execution unit, the determined source address, the determined destination address, and the determined data amount.

In this embodiment, the processor may generate the control signal based on the execution unit controlled by the control signal to be generated, the source address and destination address for controlling the execution unit to operate data, and the data amount of the data operated by the execution unit as determined in step 502.

Step 504: controlling, by using the control signal, the execution unit in the at least one execution unit to execute an operation.

In this embodiment, the processor uses the control signal generated in step 503 to control a corresponding one of the at least one execution unit to execute a corresponding operation. Each execution unit in the at least one execution unit may execute a corresponding operation under the control of the control signal generated in step 503. The operations include, but not limited to, data or command transmission between the processor and an external host, data copying between the on-chip memory and the off-chip memory of the processor, and matrix calculation.

In some alternative implementations of this embodiment, in step 502, the determining, in at least one execution unit, an execution unit controlled by a control signal to be generated according to the operation type field comprises: determining a function of the instruction based on the operation type field; and determining an execution unit executing the function in the at least one execution unit as the execution unit controlled by the control signal to be generated. The detailed processing of this implementation can be referred to the implementation corresponding to FIG. 2, and will not be repeatedly described herein.

In some alternative implementations of this embodiment, the determining a function of the instruction based on the operation type field comprises: determining an instruction type of the instruction according to the operation type field. The detailed processing of this implementation can be referred to the implementation corresponding to FIG. 2, and will not be repeatedly described herein.

In some alternative implementations of this embodiment, the above-mentioned instruction type includes: an internal copying instruction, which is an instruction for copying data on an on-chip memory and an off-chip memory of the processor; a host interface instruction, which is an instruction for transmitting a command or data between the processor and the host connected to the processor; and a calculation instruction, which is an instruction for executing a matrix operation. The detailed processing of this implementation can be referred to the implementation corresponding to FIG. 2, and will not be repeatedly described herein.

In some alternative implementations of this embodiment, in the above-mentioned step 502, the determining a source address and a destination address of data operated by the execution unit controlled by the control signal to be generated according to the source address field and the destination address field includes: determining whether the source address is located in the on-chip memory or the off-chip memory and whether the destination address is located in the on-chip memory or the off-chip memory according to the operation parameter field, if it is determined that the instruction is an in-memory copy instruction. The detailed processing of this implementation can be referred to the implementation corresponding to FIG. 2, and will not be repeatedly described herein.

In some alternative implementations of this embodiment, the determining a function of the instruction based on the operation type field further includes: determining whether the instruction is for transmitting a command or data, and determining a transmission direction, according to the operation type field, if it is determined that the instruction is a host interface instruction. The detailed processing of this implementation can be referred to the implementation corresponding to FIG. 2, and will not be repeatedly described herein.

In some alternative implementations of this embodiment, in the above-mentioned step 502, the determining a source address and a destination address of data operated by the execution unit controlled by the control signal to be generated according to the source address field and the destination address field includes: determining whether the source address is located in an on-chip memory of the host or the off-chip memory of the processor and whether the destination address is located in the on-chip memory of the host or the off-chip memory of the processor, according to the determined transmission direction, if it is determined that the instruction is for transmitting data. The detailed processing of this implementation can be referred to the implementation corresponding to FIG. 2, and will not be repeatedly described herein.

In some alternative implementations of this embodiment, the above-mentioned method further includes: determining a command transmission type of command transmission executed by the execution unit controlled by the control signal to be generated according to the operation parameter field, if it is determined that the instruction is for transmitting a command. The detailed processing of this implementation can be referred to the implementation corresponding to FIG. 2, and will not be repeatedly described herein.

In some alternative implementations of this embodiment, the determining a function of the instruction based on the operation type field further includes: determining a matrix operation type of the matrix operation executed according to the operation type field, if it is determined that the instruction is a calculation instruction. The detailed processing of this implementation can be referred to the implementation corresponding to FIG. 2, and will not be repeatedly described herein.

In some alternative implementations of this embodiment, in step 502, the determining a data amount of the data operated by the execution unit controlled by the control signal to be generated according to the operation parameter field includes: determining a matrix size of a matrix involved in the matrix operation according to the operation parameter field. The detailed processing of this implementation can be referred to the implementation corresponding to FIG. 2, and will not be repeatedly described herein.

In some alternative implementations of this embodiment, in step 502, the determining a source address and a destination address of data operated by the execution unit controlled by the control signal to be generated according to the source address field and the destination address field includes: determining whether the source address is located in the on-chip memory or the off-chip memory and whether the destination address is located in the on-chip memory or the off-chip memory, according to the operation parameter field. The detailed processing of this implementation can be referred to the implementation corresponding to FIG. 2, and will not be repeatedly described herein.

In some alternative implementations of this embodiment, in step 502, the determining an execution unit executing the function in the at least one execution unit as the execution unit controlled by the control signal to be generated includes: determining a first execution unit for executing a matrix multiplication operation and a second execution unit for executing an activation function calculation in the at least one execution unit as the execution units controlled by the control signal to be generated, if it is determined that the matrix operation type is a matrix multiplication with an activation function calculation. In addition, the above-mentioned method further includes: generating a transmission control signal for transmitting an operation result of the first execution unit to the second execution unit. The detailed processing of this implementation can be referred to the implementation corresponding to FIG. 2, and will not be repeatedly described herein.

In some alternative implementations of this embodiment, the above-mentioned method further includes: determining an activation function type of an activation function calculation according to the operation parameter field, if it is determined that the matrix operation type is a matrix operation with an activation function calculation. The detailed processing of this implementation can be referred to the implementation corresponding to FIG. 2, and will not be repeatedly described herein.

According to the method provided in the above-mentioned embodiments of the present application, because the address information is directly embedded in the instructions processed, no address needs to be read from a register file at the decoding stage, and operations such as summing an address and a segment address also do not need to be performed, thereby reducing the complexity of instruction decoding. In addition, when being executed, such an instruction can control an execution unit to operate data each time, and an operation task can be implemented by executing a small number of instructions.

In another aspect, the present application further provides a non-transitory computer storage medium. The computer storage medium may be the non-transitory computer storage medium included in the apparatus in the above embodiments, or a stand-alone computer storage medium which has not been assembled into the apparatus. The non-transitory computer storage medium stores one or more programs. When the one or more programs are executed by a processor, the processor fetches an instruction to be executed, the instruction comprising a source address field, a destination address field, an operation type field, and an operation parameter field; determines, in at least one execution unit, an execution unit controlled by a control signal to be generated according to the operation type field, determines a source address and a destination address of data operated by the execution unit controlled by the control signal to be generated according to the source address field and the destination address field, and determines a data amount of the data operated by the execution unit controlled by the control signal to be generated according to the operation parameter field; generates the control signal according to the determined execution unit, the determined source address, the determined destination address, and the determined data amount; and controls, by using the control signal, the execution unit in the at least one execution unit to execute an operation.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A processor, comprising:
   an instruction fetching unit, a decoder and at least one execution unit,
   the instruction fetching unit being configured to fetch a to-be-executed instruction, the instruction comprising a source address field, a destination address field, an operation type field, and an operation parameter field;
   the decoder being configured to determine, in the at least one execution unit, an execution unit controlled by a to-be-generated control signal according to the operation type field, determine a source address and a destination address of data operated by the execution unit controlled by the to-be-generated control signal according to the source address field and the destination address field, determine a data amount of the data operated by the execution unit controlled by the to-be-generated control signal according to the operation parameter field, and generate the control signal according to the determined execution unit, the determined source address, the determined destination address, and the determined data amount, wherein the decoder is further configured to determine whether the source address is located in on-chip memory or off-chip memory and whether the destination address is located in the on-chip memory or the off-chip memory according to the operation parameter field, if it is determined that the instruction is an in-memory copy instruction for copying data on an on-chip memory and an off-chip memory of the processor; and
   the execution unit in the at least one execution unit being configured to execute an operation under control of the control signal.

2. The processor according to claim 1, wherein the decoder is further configured to:
   determine a function of the instruction according to the operation type field; and
   determine an execution unit executing the function in the at least one execution unit as the execution unit controlled by the to-be-generated control signal.

3. The processor according to claim 2, wherein the decoder is further configured to:
   determine an instruction type of the instruction according to the operation type field.

4. The processor according to claim 3, wherein the decoder is further configured to:
   determine whether the instruction is for transmitting a command or data, and determine a transmission direction, according to the operation type field, if it is determined that the instruction is a host interface instruction for transmitting a command or data between the processor and the host connected to the processor.

5. The processor according to claim 4, wherein the decoder is further configured to:
   determine whether the source address is located in the on-chip memory of the host or the off-chip memory of the processor and whether the destination address is located in the on-chip memory of the host or the off-chip memory of the processor, according to the determined transmission direction, if it is determined that the instruction executes a data transmission.

6. The processor according to claim 4, wherein the decoder is further configured to:
   determine a command transmission type of command transmission executed by the execution unit controlled by the to-be-generated control signal according to the operation parameter field, if it is determined that the instruction executes a command transmission.

7. The processor according to claim 3, wherein the decoder is further configured to:
   determine a matrix operation type of an executed matrix operation according to the operation type field, if it is determined that the instruction is a calculation instruction for executing the matrix operation.

8. The processor according to claim 7, wherein the decoder is further configured to:
   determine a matrix size of a matrix involved in the matrix operation according to the operation parameter field.

9. The processor according to claim 7, wherein the decoder is further configured to:
   determine whether the source address is located in the on-chip memory or the off-chip memory and whether the destination address is located in the on-chip memory or the off-chip memory, according to the operation parameter field.

10. The processor according to claim 7, wherein the decoder is further configured to:
    determine a first execution unit for executing a matrix multiplication operation and a second execution unit for executing an activation function calculation in the at least one execution unit as the execution units controlled by the to-be-generated control signal, if it is determined that the matrix operation type is a matrix multiplication with an activation function calculation, and generate a transmission control signal for transmitting an operation result of the first execution unit to the second execution unit.

11. The processor according to claim 7, wherein the decoder is further configured to:
determine an activation function type of an activation function calculation according to the operation parameter field, if it is determined that the matrix operation type is a matrix operation with an activation function calculation.

12. A method for executing an instruction on a processor, comprising:
fetching a to-be-executed instruction, the instruction comprising a source address field, a destination address field, an operation type field, and an operation parameter field;
determining, in at least one execution unit, an execution unit controlled by a to-be-generated control signal according to the operation type field, determining a source address and a destination address of data operated by the execution unit controlled by the to-be-generated control signal according to the source address field and the destination address field, and determining a data amount of the data operated by the execution unit controlled by the to-be-generated control signal according to the operation parameter field, wherein the determining a source address and a destination address of data operated by the execution unit controlled by the to-be-generated control signal according to the source address field and the destination address field comprises: determining whether the source address is located in on-chip memory or off-chip memory and whether the destination address is located in the on-chip memory or the off-chip memory according to the operation parameter field, if it is determined that the instruction is an in-memory copy instruction;
generating the control signal according to the determined execution unit, the determined source address, the determined destination address, and the determined data amount; and
controlling, by using the control signal, the execution unit in the at least one execution unit to execute an operation.

13. The method according to claim 12, wherein the determining, in at least one execution unit, an execution unit controlled by a to-be-generated control signal according to the operation type field comprises:
determining a function of the instruction according to the operation type field; and
determining an execution unit executing the function in the at least one execution unit as the execution unit controlled by the to-be-generated control signal.

14. The method according to claim 13, wherein the determining a function of the instruction based on the operation type field comprises:
determining an instruction type of the instruction according to the operation type field.

15. The method according to claim 14, wherein the determining a function of the instruction based on the operation type field further comprises:
determining whether the instruction is for transmitting a command or data, and determining a transmission direction, according to the operation type field, if it is determined that the instruction is a host interface instruction for transmitting a command or data between the processor and the host connected to the processor.

16. The method according to claim 15, wherein the determining a source address and a destination address of data operated by the execution unit controlled by the to-be-generated control signal according to the source address field and the destination address field comprises:
determining whether the source address is located in the on-chip memory of the host or the off-chip memory of the processor and whether the destination address is located in the on-chip memory of the host or the off-chip memory of the processor, according to the determined transmission direction, if it is determined that the instruction executes a data transmission.

17. The method according to claim 15, further comprising:
determining a command transmission type of command transmission executed by the execution unit controlled by the to-be-generated control signal according to the operation parameter field, if it is determined that the instruction executes a command transmission.

18. The method according to claim 14, wherein the determining a function of the instruction based on the operation type field further comprises:
determining a matrix operation type of an executed matrix operation according to the operation type field, if it is determined that the instruction is a calculation instruction for executing the matrix operation.

19. The method according to claim 18, wherein the determining a data amount of the data operated by the execution unit controlled by the to-be-generated control signal according to the operation parameter field comprises:
determining a matrix size of a matrix involved in the matrix operation according to the operation parameter field.

20. The method according to claim 18, wherein the determining a source address and a destination address of data operated by the execution unit controlled by the to-be-generated control signal according to the source address field and the destination address field comprises:
determining whether the source address is located in the on-chip memory or the off-chip memory and whether the destination address is located in the on-chip memory or the off-chip memory, according to the operation parameter field.

21. The method according to claim 18, wherein the determining an execution unit executing the function in the at least one execution unit as the execution unit controlled by the to-be-generated control signal comprises:
determining a first execution unit for executing a matrix multiplication operation and a second execution unit for executing an activation function calculation in the at least one execution unit as the execution units controlled by the to-be-generated control signal, if it is determined that the matrix operation type is a matrix multiplication with an activation function calculation; and
the method further comprises:
generating a transmission control signal for transmitting an operation result of the first execution unit to the second execution unit.

22. The method according to claim 18, further comprising:
determining an activation function type of an activation function calculation according to the operation parameter field, if it is determined that the matrix operation type is a matrix operation with an activation function calculation.

\* \* \* \* \*